US009473392B2

(12) United States Patent
Del Regno et al.

(10) Patent No.: US 9,473,392 B2
(45) Date of Patent: Oct. 18, 2016

(54) MIDSPAN RE-OPTIMIZATION OF TRAFFIC ENGINEERED LABEL SWITCHED PATHS (71) Applicant: Verizon Patent and Licensing Inc., Basking Ridge, NJ (US)

(72) Inventors: Christopher N. Del Regno, Rowlett, TX (US); Matthew W. Turlington, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 784 days.

(21) Appl. No.: 13/887,599

(22) Filed: May 6, 2013

(65) Prior Publication Data
US 2014/0328163 A1 Nov. 6, 2014

(51) Int. Cl.
*H04L 12/703* (2013.01)
(52) U.S. Cl.
CPC ..................... *H04L 45/28* (2013.01)
(58) Field of Classification Search
None
See application file for complete search history.

(56) References Cited

U.S. PATENT DOCUMENTS

| | | | | |
|---|---|---|---|---|
| 7,512,063 B2 * | 3/2009 | Vasseur | ............... | H04L 12/5695 370/217 |
| 7,633,860 B2 * | 12/2009 | Li | ...................... | H04L 41/0668 370/225 |
| 7,859,993 B1 * | 12/2010 | Choudhury | ......... | H04L 41/0681 370/217 |
| 7,961,626 B2 * | 6/2011 | Reeve | ..................... | H04L 45/00 370/235 |
| 9,019,814 B1 * | 4/2015 | Mohanty | ................. | H04L 45/00 370/219 |
| 9,160,652 B2 * | 10/2015 | Taillon | .................... | H04L 45/22 |
| 2002/0004843 A1 * | 1/2002 | Andersson | .............. | H04L 45/00 709/238 |
| 2003/0204768 A1 * | 10/2003 | Fee | ........................... | H04L 1/22 714/4.12 |
| 2003/0236089 A1 * | 12/2003 | Beyme | ............... | H04B 17/0087 455/423 |
| 2006/0126502 A1 * | 6/2006 | Vasseur | ................... | H04L 45/04 370/221 |
| 2007/0011284 A1 * | 1/2007 | Le Roux | ............. | H04L 12/5695 709/223 |
| 2007/0058568 A1 * | 3/2007 | Previdi | ................... | H04L 45/50 370/254 |
| 2007/0070909 A1 * | 3/2007 | Reeve | ..................... | H04L 45/00 370/238 |
| 2007/0183317 A1 * | 8/2007 | Vasseur | ..................... | H04J 3/14 370/225 |
| 2007/0189265 A1 * | 8/2007 | Li | ....................... | H04L 41/0668 370/351 |
| 2008/0304494 A1 * | 12/2008 | Yokoyama | ............ | H04W 48/02 370/400 |
| 2009/0219806 A1 * | 9/2009 | Chen | ...................... | H04L 45/00 370/219 |
| 2010/0157807 A1 * | 6/2010 | Csaszar | ................... | H04L 45/00 370/237 |
| 2010/0177631 A1 * | 7/2010 | Chen | ...................... | H04L 45/00 370/221 |
| 2011/0280123 A1 * | 11/2011 | Wijnands | .............. | H04L 45/507 370/228 |

(Continued)

*Primary Examiner* — Ayaz Sheikh
*Assistant Examiner* — Faiyazkhan Ghafoerkhan (57) ABSTRACT

A technique for mid-span re-optimization of traffic engineered label switched paths within a network that uses a label switching protocol (e.g., MPLS) enables a network operator to move traffic to quickly prepare for link or nodal maintenance. The technique establishes, at an intermediate router, a first label switch path (LSP) along a path between an ingress router and an egress router. The intermediate router forwards traffic via the first LSP and establishes a bypass tunnel to protect against link failure between the intermediate router and a next intermediate router on the first LSP. The intermediate router continues forwarding traffic on the first LSP, instead of the bypass tunnel, based on the receipt of a link failure simulation instruction at the intermediate router from a network administration node. The intermediate router discontinues forwarding the traffic via the first LSP based on the receipt of second signaling.

22 Claims, 9 Drawing Sheets

(56) References Cited

U.S. PATENT DOCUMENTS

| | | | |
|---|---|---|---|
| 2011/0286324 A1* | 11/2011 | Bellagamba | H04L 41/0677 370/219 |
| 2012/0033542 A1* | 2/2012 | Hanif | H04L 45/00 370/217 |
| 2013/0094355 A1* | 4/2013 | Nakash | H04L 45/28 370/228 |
| 2013/0182559 A1* | 7/2013 | Fujioka | H04L 41/0668 370/218 |
| 2013/0235716 A1* | 9/2013 | Vasseur | H04L 12/66 370/221 |
| 2013/0259056 A1* | 10/2013 | Kotrabasappa | H04L 45/24 370/401 |
| 2013/0301403 A1* | 11/2013 | Esale | H04L 45/16 370/221 |
| 2013/0336103 A1* | 12/2013 | Vasseur | H04L 41/12 370/216 |
| 2013/0336107 A1* | 12/2013 | Vasseur | H04L 41/0654 370/218 |
| 2014/0064062 A1* | 3/2014 | Taillon | H04L 45/22 370/225 |
| 2014/0328163 A1* | 11/2014 | Del Regno | H04L 45/28 370/225 |

\* cited by examiner

MIDSPAN RE-OPTIMIZATION OF TRAFFIC ENGINEERED LABEL SWITCHED PATHS

BACKGROUND

Multiprotocol label switching (MPLS) is a connection oriented routing technique used in data networks for directing data from one node to a next node in the network based on path labels rather than network addresses (e.g., Internet Protocol (IP) traffic routing). Use of the path labels, instead of network addresses, avoids complex routing table lookups.

IP is a connectionless routing technique where routers route packets based on destination and/or source IP addresses. The forwarding decision at the router is made on a hop-by-hop basis without setting up a connection. In a connectionless routing technique, bandwidth typically cannot be reserved for a given packet session. In an IP network, each router routes each received packet by matching the destination IP address with entries in the routing table using a longest prefix matching algorithm.

MPLS, being a connection oriented routing packet forwarding mechanism, forwards packets based on a fixed-length, short label that corresponds to a label switched path (LSP) that has been previously established via signaling between an ingress and egress node in the network, and via intermediate nodes on the path between the ingress and egress nodes. Forwarding attributes (e.g., bandwidth) for the virtual link (i.e., label switch path) are typically negotiated during the connection set-up signaling. MPLS, therefore, introduces signaling overhead to establish the label switch path, but results in subsequent less complicated packet forwarding with less delay relative to IP.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement a technique for mid-span manual or automated re-optimization of traffic engineered label switched paths within a network that uses a label switching protocol (e.g., MPLS). Exemplary embodiments described herein, using the mid-span re-optimization of label switched paths, enable a network operator to move traffic quickly in a network using a label switching protocol to prepare for link or nodal maintenance. Once maintenance is complete, the network operator may move the traffic back, restoring the label switch path(s) to the most optimal (e.g., least latency) path(s). Exemplary embodiments described herein, when applied globally to a switch/router, can be used to proactively trigger network re-optimization on a switch/router global basis periodically.

Figure 1A:
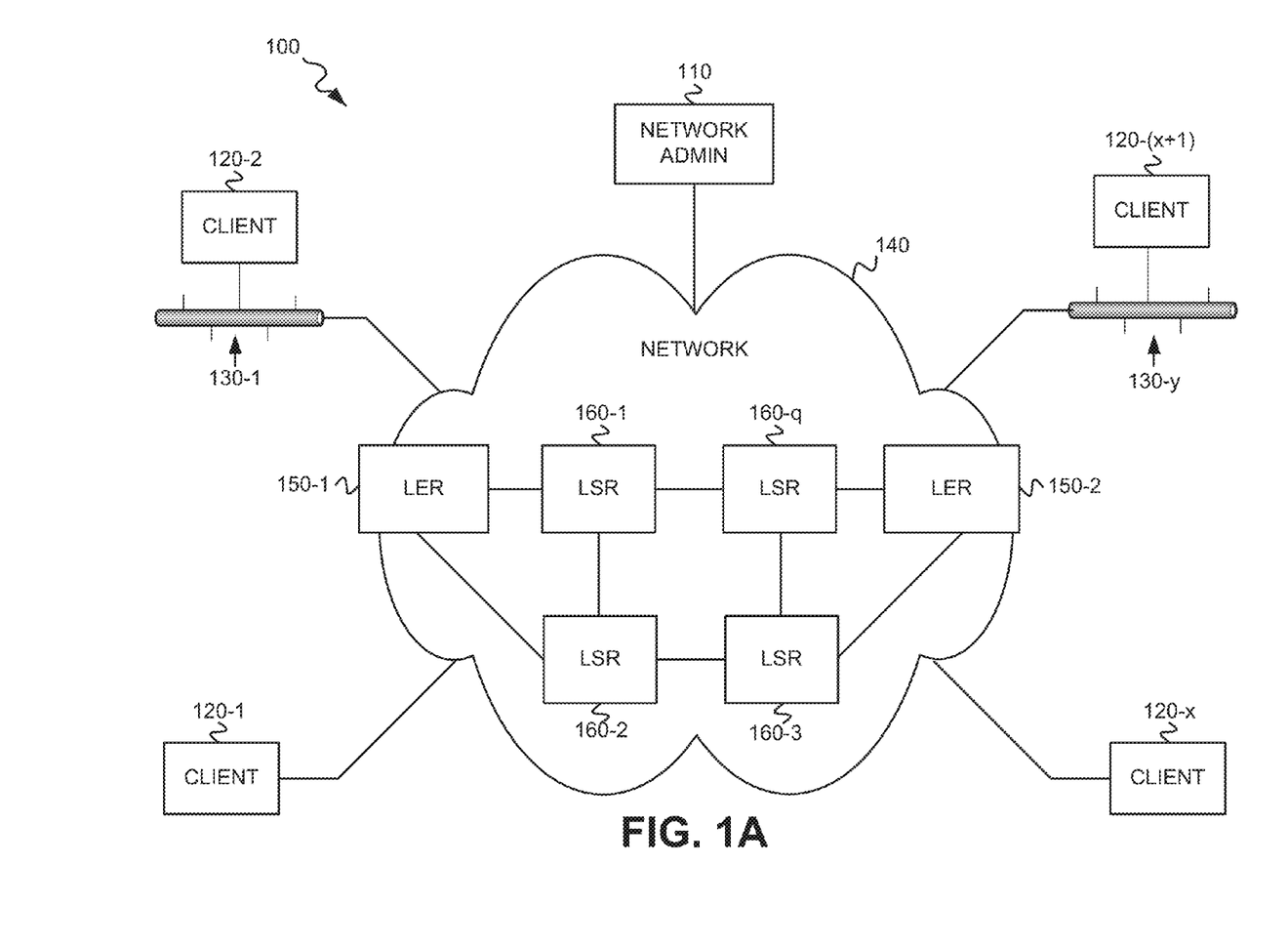
FIG. 1A depicts an exemplary network environment in which mid-span re-optimization of traffic engineered label switched paths may be implemented in accordance with exemplary implementations described herein.

FIG. 1A illustrates an exemplary network environment 100 in which mid-span re-optimization of traffic engineered label switched paths may be implemented in accordance with exemplary implementations described herein. Network environment 100 may include a network administration node 110, clients 120-1 through 120-(x+1) (individually and generically referred to herein as "client 120"), local networks 130-1 through 130-y (individually and generically referred to herein as "local network 130"), and network 140.

Network administration node 110 may include a network device (e.g., a server) associated with a network administrator or network operator, such as, for example, a network operations center (NOC) network device. A network administrator may send, via network administration node 110, instructions to provider edge (PE) label edge routers (LERs) 150-1 through 150-2 and intermediate label switch routers (LSRs) 160-1 through 160-q. The instructions may include, for example, instructions for manually setting metrics associated with links between the LSRs of network 140, or for sending link failure simulation instructions, as described further herein, to intermediate LSRs 160-1 through 160-q.

Clients 120-1 through 120-(x+1) may each include any type of computing device that has communication capabilities. Client devices 120-1 through 120-(x+1) may each include, for example, a telephone (e.g., a smart phone), a computer (e.g., laptop, palmtop, desktop, or tablet computer), a set-top box (STB), a gaming device, or a personal digital assistant (PDA). Client devices 120-1 through 120-(x+1) may connect with local network 130 or network 140 via wired or wireless links.

As shown in FIG. 1A, local networks 130-1 through 130-y may each include at least one corresponding connected client 120-2 through 120-(x+1). Each of local networks 130-1 through 130-y may interconnect with network 140 for communicating traffic from local network 130 to network 140, or from network 140 to network 130. Each of local networks 130-1 through 130-y may include, for example, a local area network (LAN). Each of local networks 130-1 through 130-y may, alternatively, include other types of networks.

In the example depicted in FIG. 1A, network 140 includes provider edge LERs 150-1 and 150-2 and intermediate LSRs 160-1 through 160-q. LERs 150-1 and 150-2 reside at an edge of network 140 so as to send/receive traffic to/from clients 120-1 through 120-(x+1). LERs 150-1 and 150-2 may forward traffic received from a client 120 towards a destination client via an intermediate LSR 160. LERs 150-1 and 150-2 may additionally forward traffic received from an intermediate LSR 160 to a destination client 120. Intermediate LSRs 160-1 through 160-q may forward traffic along one or more established LSPs, or, in the case of a link failure, along one or more bypass LSPs.

Network 140 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Network 140 may enable clients 120-1 through 120-(*x*+1) to communicate with one another, or with other network nodes, by data forwarding through one or more label switched paths.

The configuration of network components of network environment 100 shown in FIG. 1A is for illustrative purposes. Other configurations may be implemented. Therefore, network environment 100 may include additional, fewer and/or different components, that may be configured in a different arrangement, than that depicted in FIG. 1A. For example, network 140 may include a different number, and/or a different arrangement, of LSRs or LERs than that shown in FIG. 1A.

Figure 1B:
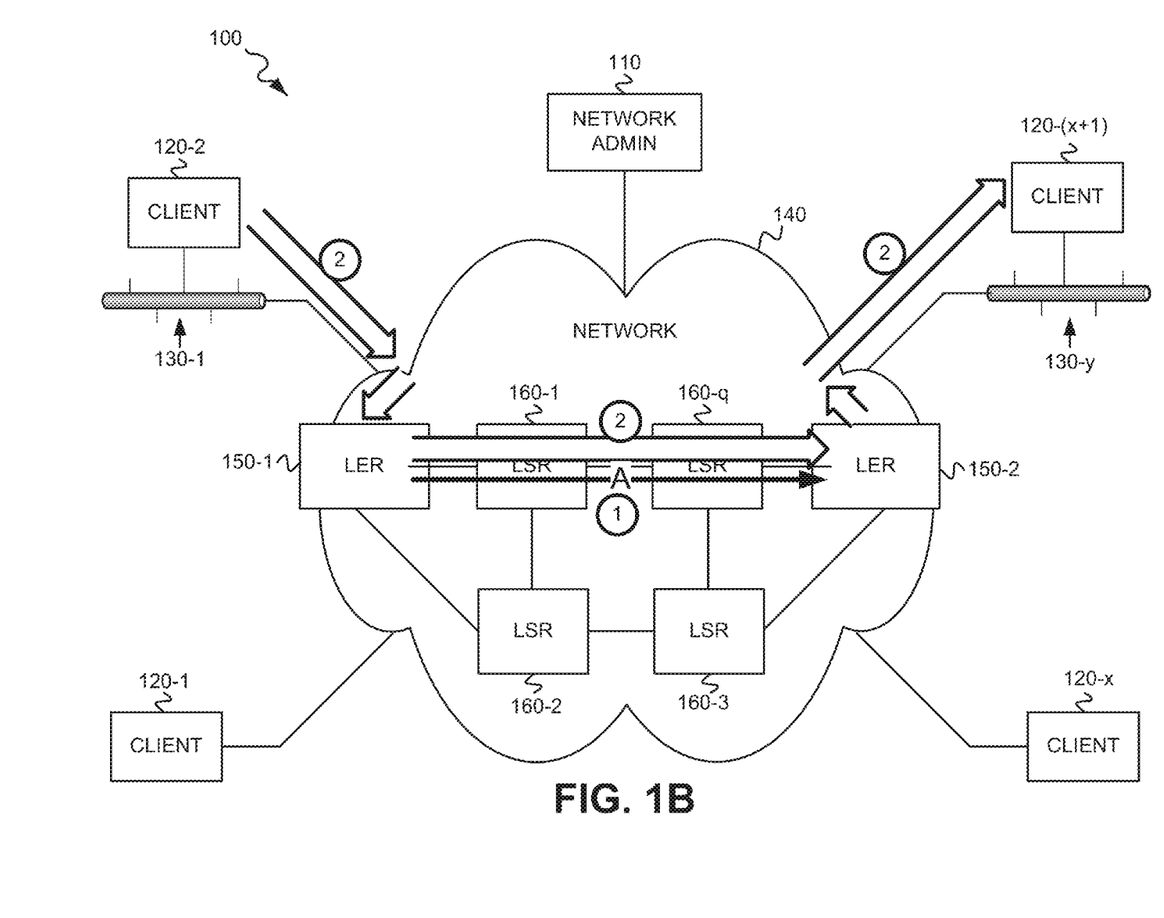
FIG. 1B depicts end-to-end data traffic forwarding via a label switch path in the exemplary network environment of FIG. 1A.

FIG. 1B depicts end-to-end data traffic forwarding via a label switch path in the exemplary network environment 100 of FIG. 1A. FIG. 1B depicts a label switch path A (denoted with a "1" inside a circle) established between LER 150-1 and LER 150-2 via intermediate LSRs 160-1 and 160-q. As shown, client 120-2 of local network 130-1 may send data traffic (denoted with a "2" inside a circle) via LSP A to client 120-(*x*+1). Label Switched Path (LSP) "A" may be established using existing label switching protocols, such as, for example, traffic engineered MPLS. The LSPs described herein, therefore, may include traffic engineered LSPs.

Figure 2:
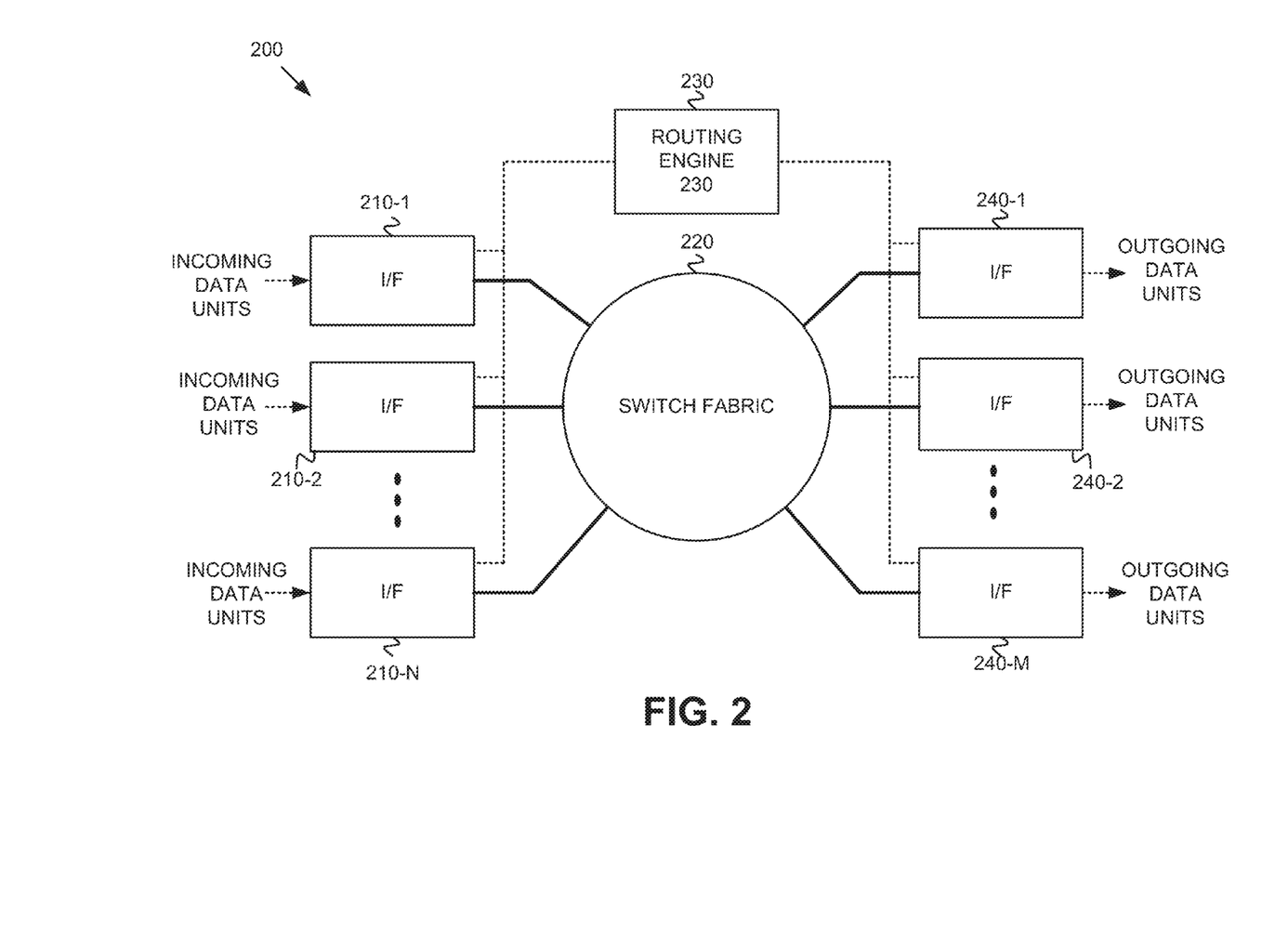
FIG. 2 is a diagram that illustrates an exemplary configuration of a label switch router that may correspond to the provider edge label edge routers and intermediate label switch routers of FIGS. 1A and 1B.

FIG. 2 illustrates a configuration of a label switch router (LSR) 200 that may correspond to provider edge LERs 150-1 and 150-2 and intermediate LSRs 160-1 through 160-q. LSR 200 may receive one or more data units from one or more incoming physical links, process the data units using, for example, MPLS, and transmit the data units on one or more outgoing LSPs. The data units may include packets, cells, or datagrams; fragments of packets, cells, or datagrams; or other types of data. The one or more incoming physical links and the one or more outgoing links may connect to network 140.

LSR 200 may include one or more ingress interfaces 210-1 through 210-N (generically and individually referred to herein as an "ingress interface 210"), a switch fabric 220, a routing engine 230, and one or more egress interfaces 240-1 through 240-M (generically and individually referred to herein as an "egress interface 240"). Each ingress interface 210 may receive incoming data units via one or more physical links and may forward the received data units through switch fabric 220 to a respective egress interface. Each ingress interface 210 may forward received data units to a respective egress interface 240 using, for example, a forwarding information base (FIB) table received from routing engine 230.

Routing engine 230 may communicate with other nodes (e.g., other LSRs) connected to router 200 to establish LSPs for MPLS data forwarding. Routing engine 230 may create a forwarding table based on signaling received from other LSRs and may download the forwarding table to each ingress interface 210 and each egress interface 240. Routing engine 230 may also perform other general control and monitoring functions for router 200.

Switch fabric 220 may include one or more switching planes to facilitate communication between ingress interface 210-1 through 210-N and egress interfaces 240-1 through 240-M. In one exemplary implementation, each of the switching planes may include a three-stage switch of crossbar elements. Other types of switching planes may, however, be used in switch fabric 220. Egress interfaces 240-1 through 240-M may receive data units from switch fabric 220 and may forward the data units towards destinations in the network via one or more outgoing physical links.

LSR 200 may include fewer, additional and/or different components than are shown in FIG. 2. LSR 200 may include differently arranged components than those shown in FIG. 2. The interfaces in FIG. 2 have been arbitrarily designated as "ingress interfaces" or "egress interfaces" for purposes of illustration. Each one of interfaces 210-1 through 210-N or 240-1 through 240-M may act as an ingress and/or an egress interface. Thus, each one of interfaces 210-1 through 210-N or 240-1 through 240-M may receive data units from network 140, or forward data units received from switch fabric 220 towards destinations in network 140.

Figure 3:
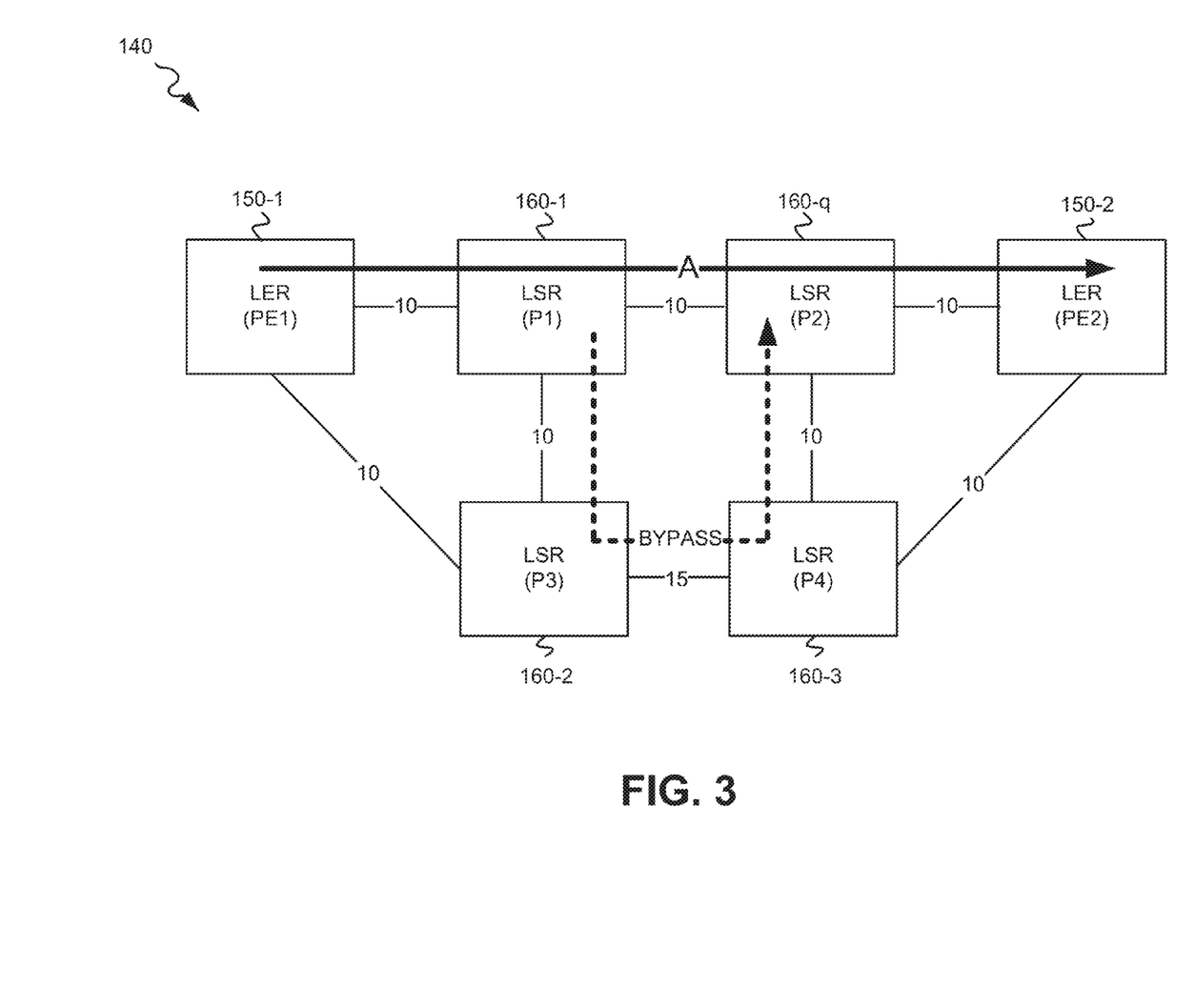
FIG. 3 is a diagram that depicts a label switch path and a backup bypass tunnel along paths between routers in an exemplary network.

In networks that use MPLS traffic engineered label switched paths, there is no ability, using existing protocols, outside of network failure events, to instantly influence LSPs which only transit a router/switch. In the example of network 140 shown in FIG. 3, an LSP "A," which represents a lowest cost path having a total accumulated metric of 30 (i.e., 10+10+10), has been established between LER 150-1 (PE1) and LER 150-2 (PE2) via intermediate LSRs 160-1 (P1) and 160-q (P2). Based on the signaling associated with LSP "A," which includes a request for either link or nodal protection, intermediate LSR P1 may construct, as shown in FIG. 3, a bypass tunnel from P1 to P2 via LSRs 160-2 (P3) and 160-3 (P4) to protect against a link failure between P1 and P2. The bypass tunnel from P1 to P2 via P3 and P4 may have, as shown in FIG. 3, an accumulated metric of 35 (i.e., 10+15+10). Alternatively, instead of an MPLS FastReroute Bypass protection tunnel, a MPLS FastReroute Reroute protection tunnel may be established (not shown) to protect against a link failure between P1 and P2.

Figure 4:
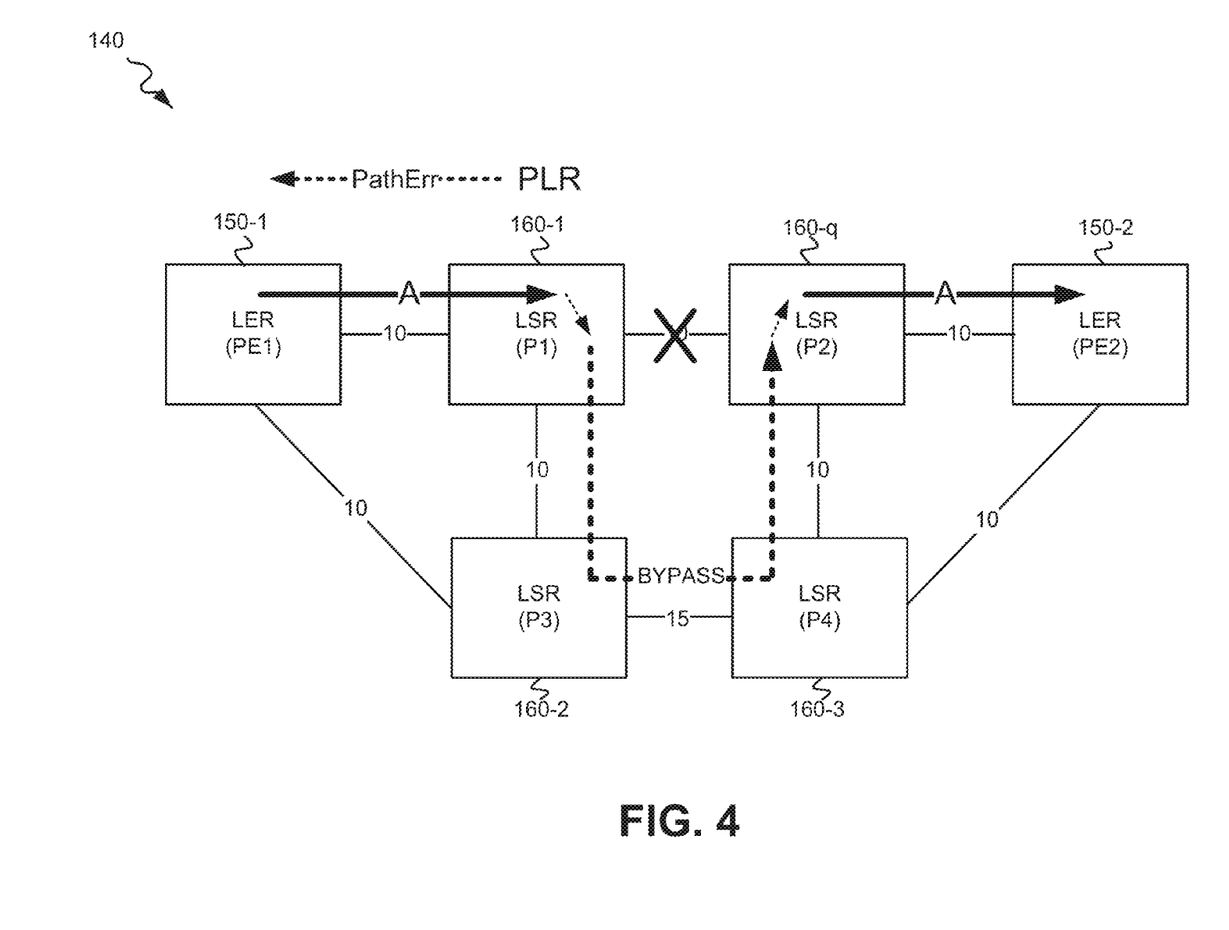
FIG. 4 is a diagram that depicts the use of a bypass tunnel, instead of a primary label switch path, due to a link failure along the primary label switch path in an exemplary network.
Figure 5:
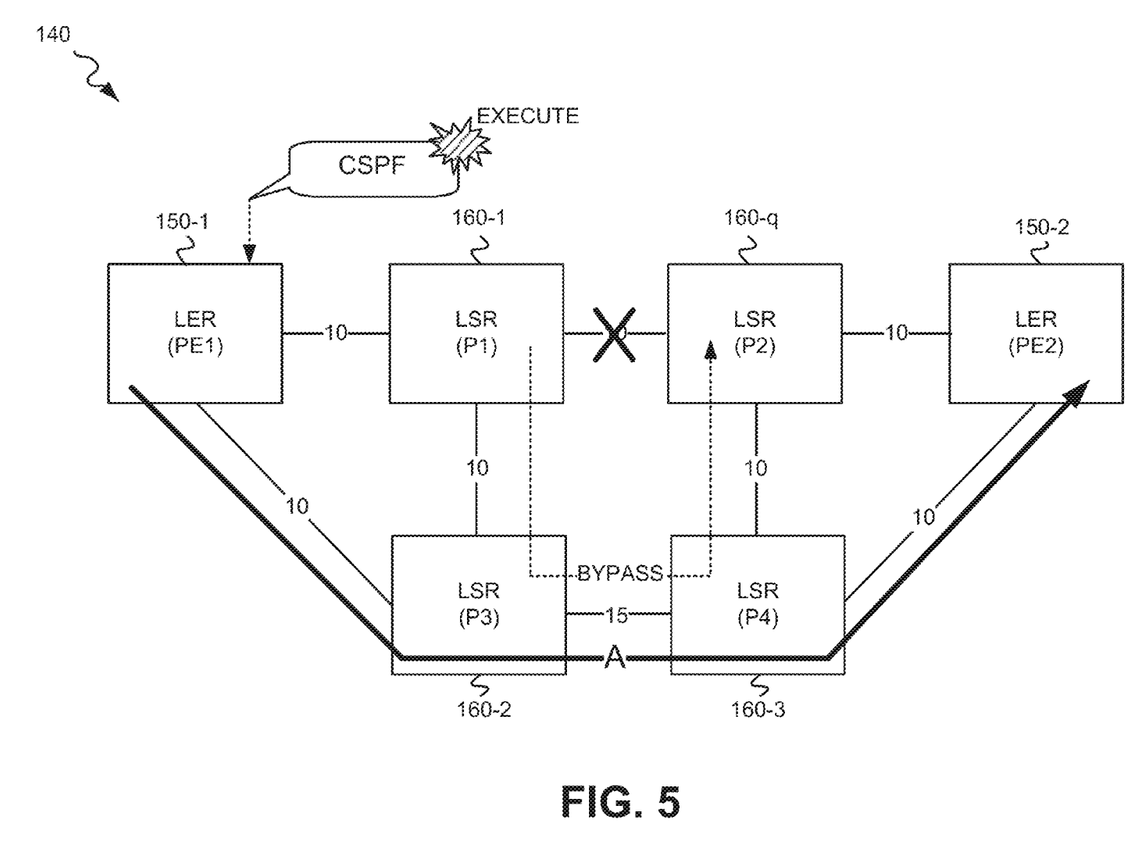
FIG. 5 is a diagram that depicts the use of a new alternate path between two edge routers in the exemplary network of FIG. 4 as a result of a link failure along a primary label switch path.

As shown in FIG. 4, if the link between P1 and P2 fails or is operationally shutdown, P1 immediately switches the traffic arriving in LSP "A" onto the bypass tunnel. This occurs very quickly since the bypass tunnel is already established and operational. This quick switch permits LSP "A" to continue forwarding traffic in the event of a failure. Once the forwarding change is made in router P1, P1 becomes the Point of Local Repair (PLR). As the PLR, for every LSP P1 has switched to the bypass tunnel, P1 sends a path error message (e.g., a resource reservation protocol (RSVP) PathErr message) to the originator of the LSP. As shown in FIG. 4, when the link between P1 and P2 fails (shown by an "X"), router P1, as the PLR, sends a path error message with, for example, an error code of "notify" (error code=25), and an error value field of ss00 cc cccc cccc cccc, where ss=00 and the sub-code=3 ("tunnel locally repaired"), as set forth in Network Working Group, Request for Comments (RFC) 4090, section 6.5.1. When router PE1 receives the notification of the path error message, PE1 can attempt to find a better path for LSP "A" by executing the Constrained Shortest Path First (CSPF) algorithm. As depicted in FIG. 5, by executing the CSPF algorithm, router PE1 determines that the path from PE1 to PE2 through LSR 160-2 (P3) and 160-3 (P4) is now the optimal path with an accumulated metric of 35 (i.e., 10+15+10). Router PE then signals a new path for LSP A that includes PE1, P3, P4 and PE2. LER PE1 may, in some implementations, additionally signal the LSRs of the old LSP "A" to delete LSP "A."

During normal network operation (i.e., non-failure operation), it is often beneficial to move traffic off of particular links, or entire routers/switches, in preparation for network maintenance. In traffic engineered LSPs, once the LSP is signaled and established, changes in the cost of links associated with the path of the LSP do not immediately trigger a path update. Therefore, many network operators implement a re-optimization timer, upon the expiration of which, the ingress LSR (e.g., PE1) re-computes the optimal path and re-signals if the computation, based on changes in the costs of links associated with the path of the LSP, results in a different path. While this computation allows the network to move traffic off of the LSP (e.g., between P1 and P2 in FIG. 5), it is a gradual process that occurs over the specified time interval. For example, if the re-optimization interval is 30 minutes, then it could take up to 30 minutes to move traffic off the original LSP such that maintenance can be started.

Alternatively, some implementations support a local tool where an operator may trigger the optimization of an LSP. This is, however, only supported at the originating LER (e.g., at PE1 in FIG. 5). In a real-world network, there could be hundreds, or even thousands, of LSPs traversing a single link/node. Therefore, having to manually trigger an optimization of an LSP using a local tool for every originating LER to re-optimize the relevant LSPs is highly impractical. Network providers/operators need a way to trigger the re-signaling of LSPs from the middle of the network, without incurring delays in moving the traffic onto re-optimized LSPs.

Implementations described herein propose the use of a "dummy" fast re-route event to trigger path re-optimization from within the path of an LSP. In this "dummy" fast re-route event, no physical outage or failure actually occurs. The network operator/administrator instructs the LSR to simulate a failure at a logical interface, port, link aggregation, or switch level. However, instead of moving the traffic from LSP "A" to the bypass tunnel, the traffic remains on LSP "A" (shown in FIG. 3). The PLR, though, sends the path error message to the ingress LSR (e.g., PE1) to indicate that LSP "A" has been locally repaired. Receipt of the path error message causes the ingress LSR to re-compute the optimal path between the ingress LSR and the egress LSR based on the link metric assigned by the network operator/administrator to the link of which the failure is being simulated. Re-computation of the optimal path results in the ingress LSR signaling an alternate path and, once the new path is established, the ingress LSR moves the traffic from the original LSP A to the new LSP. Details of the fast re-route process for triggering a re-optimization from within the path of an LSP is described below with respect to FIGS. 6A, 6B and 7.

Figure 6A:
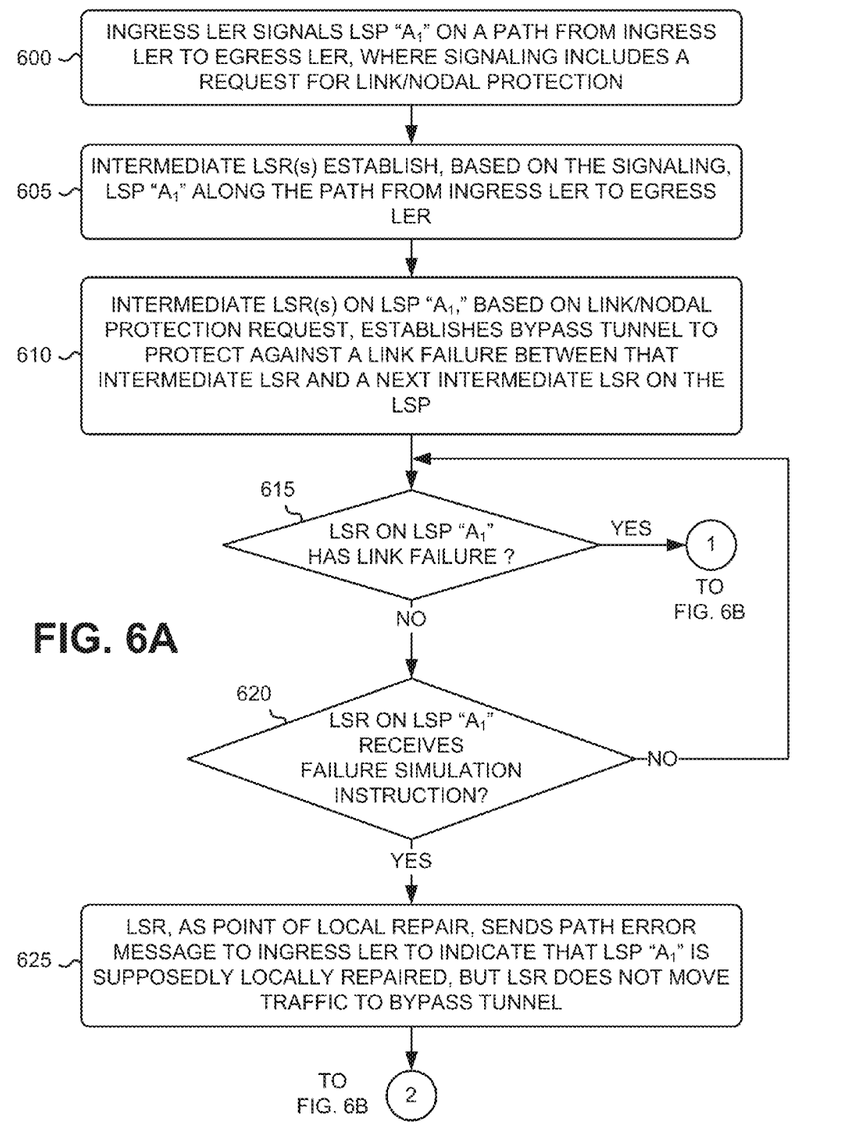
FIGS. 6A and 6B are flow diagrams of an exemplary process for providing a "dummy" fast re-route event for triggering path re-optimization from within the path of an LSP.
Figure 6B:
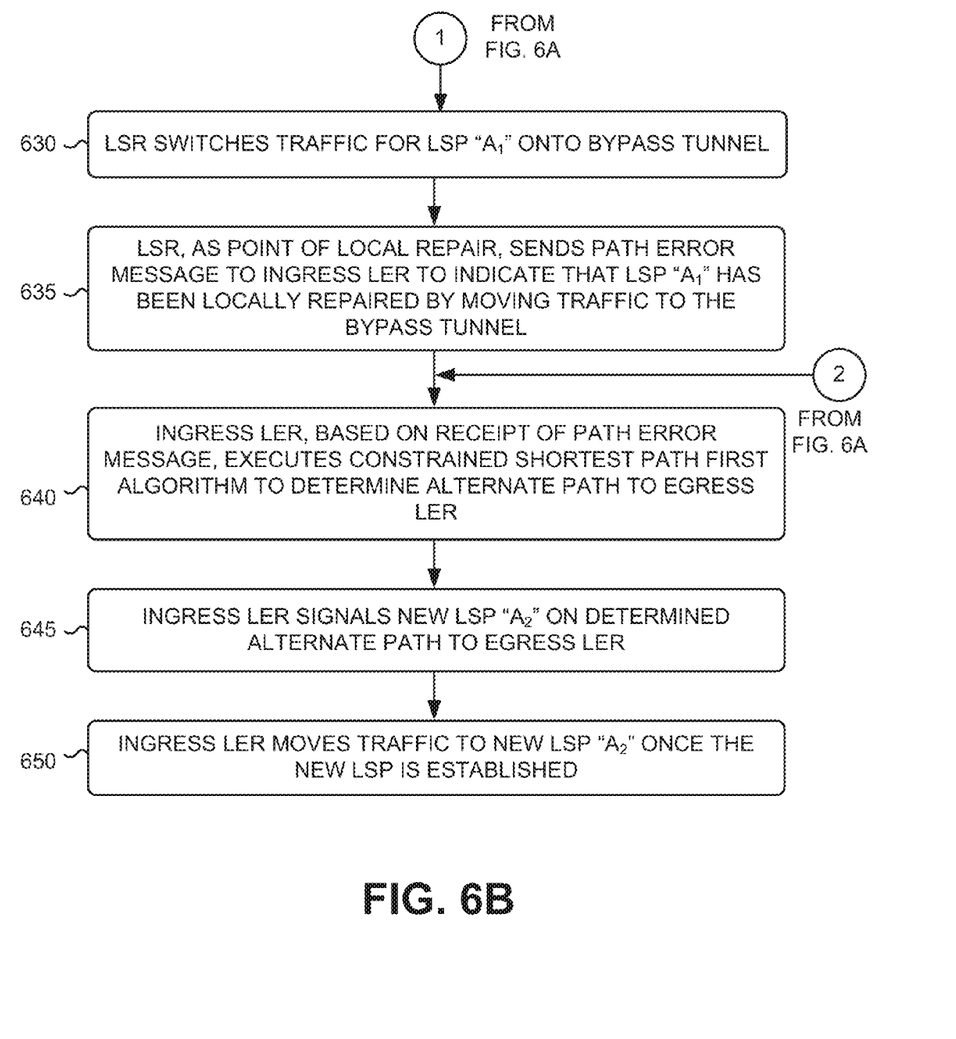

FIGS. 6A and 6B are flow diagrams of an exemplary process for providing a "dummy" fast re-route event for triggering path re-optimization from within the path of an LSP. The exemplary process of FIGS. 6A and 6B is described below with reference to the example network 140 depicted in FIG. 7.

Figure 7:
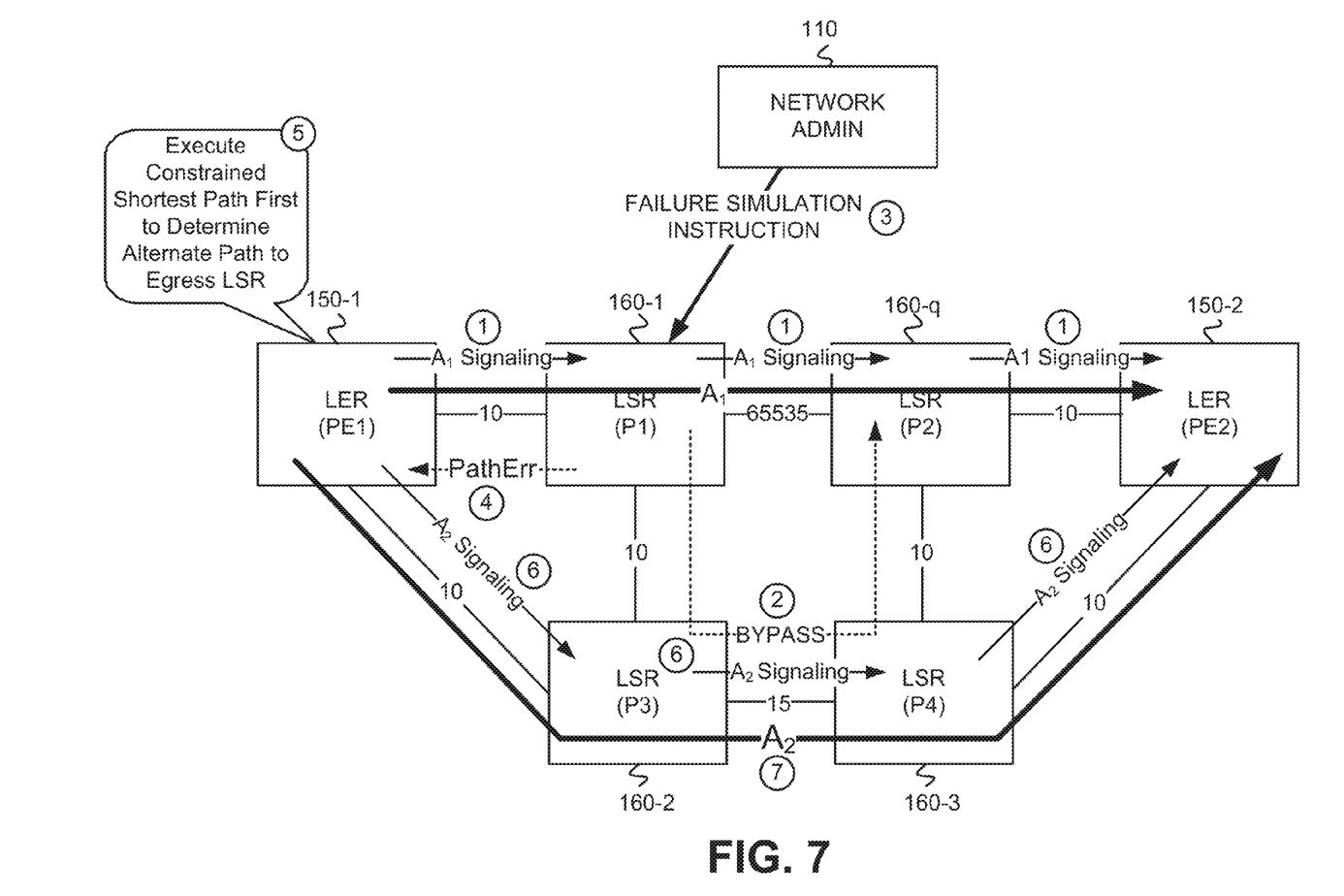
FIG. 7 is a diagram that graphically depicts the exemplary process of FIGS. 6A and 6B within the exemplary network of FIGS. 1A and 1B.

The exemplary process may include the ingress LER signaling the LSP (e.g., LSP "$A_1$") on a path from the ingress LER to the egress LER, where the signaling includes a request for link or nodal protection (block 600). FIG. 7 depicts the signaling of a label switch path $A_1$ from ingress LER 150-1 to egress LER 150-2 (signaling identified with a "1" within a circle). Though not shown in the signaling of FIG. 7, the signaling of LSP $A_1$ may include a request for link/nodal protection. Intermediate LSR(s) may establish, based on the signaling from the ingress LSR, LSP "A" along the path from the ingress LER to the egress LER (block 605). Each intermediate LSR 160 between ingress LER 150-1 and egress LER 150-2, after receiving the signaling for LSP "$A_1$", sets up the LSR 160's routing table to establish LSP "$A_1$" in accordance with existing label switching techniques.

Intermediate LSR(s) on LSP "$A_1$," based on the link or nodal protection request, establishes a bypass tunnel to protect against a link failure between that intermediate LSR and a next intermediate LSR on the LSP (block 610). Each intermediate LSR 160 between ingress LER 150-1 and egress LER 150-2, after receiving the request for link or nodal protection in the signaling for LSP "As", establishes a bypass tunnel between that intermediate LSR and a next intermediate LSR on the LSP. For example, as shown in FIG. 7, LSR P1, subsequent to receiving the request for link or nodal protection, establishes a bypass tunnel (identified with a "2" within a circle in FIG. 7), in accordance with existing techniques, between LSR P1 and LSR P2.

A LSR on LSP "$A_1$" determines whether it has a link failure (block 615). If so (YES—block 615), then the LSR switches the traffic for LSP "$A_1$" onto the bypass tunnel (block 630). The LSR, as a Point of Local Repair (PLR), sends a path error message to the ingress LSR to indicate that LSP "$A_1$" has been locally repaired by moving traffic to the bypass tunnel (block 635).

Returning to block 615, if the LSR on LSP "$A_1$" determines that there has been no link failure (NO—block 615), then the LSR on LSP "As" determines whether it has received a failure simulation instruction (block 620). The LSR may, for example, receive a failure simulation instruction from network admin 110. FIG. 7 depicts network admin 110 sending a failure simulation instruction (identified with a "3" within a circle) to intermediate LSR P1. The failure simulation instruction may identify the link the failure of which is being simulated. In addition to the failure simulation instruction, network admin 110 may assign a very high link metric (e.g., link metric=65535 between LSRs P1 and P2 in example of FIG. 7) to the link the failure of which is being simulated. The re-assigned link metric value may be included with a message that includes the identification of the link of which a failure is being simulated, or network admin 110 may send it in a separate message. If a failure simulation instruction is not received at the LSR (NO—block 620), then the exemplary process may return to block 615, and blocks 615 and 620 may iteratively repeat until a link failure occurs, until a failure simulation instruction is received, or until signaling is received (not shown in FIGS. 6A and 6B) that causes the deletion of LSP "$A_1$."

If the LSR on LSP "$A_1$" receives a failure simulation instruction (YES—block 620), then the LSR, as a PLR, sends a path error message to the ingress LER to indicate that LSP "$A_1$" is supposedly locally repaired, but, since this is a failure simulation, the LSR does not actually move the traffic to the bypass tunnel (block 625). The exemplary process continues at block 640 in FIG. 6B. FIG. 7 depicts LSR P1 sending a path error message (identified with a "4" within a circle) to ingress LER PE1. However, unlike in the circumstance of the actual link failure (e.g., blocks 615, 630 and 635 above), the LSR that received the failure simulation instruction does not move the traffic for LSP "A" to the bypass tunnel, but continues to forward traffic over LSP "$A_1$" (e.g., from LSR P1 to LSR P2). The LSR continues forwarding the traffic over LSP "$A_1$" until ingress LER PE1 determines, and signals, an alternate new path, as described with respect to blocks 640, 645 and 650.

Subsequent to block 635, or block 625, the ingress LER, based on receipt of a path error message from an intermediate LSR, executes the Constrained Shortest Path First algorithm to determine an alternate path to the egress LER (block 640). FIG. 7 depicts (identified with a "5" within a circle) ingress LER PE1 executing the CSPF algorithm to determine an alternate path through network 140 to egress LER PE2. With the assignment of link metric 65535 to the link between LSRs P1 and P2, the CSPF determines, in the example of FIG. 7, that the alternate path from LER PE1 through LSRs P3 and P4 to LER PE2 has lower accumulated link metrics. The ingress LER signals a new LSP on the determined alternate path to the egress LER (block 645). Additionally, the ingress LER may, in some implementations, signal along LSP "A$_1$" to instruct the LSRs along the LSP to delete/tear down LSP "A$_1$." Once ingress LER PE1 determines alternate path PE1-P3-P4-PE2 using the CSPF algorithm, LER PE1, as shown in FIG. 7, signals an alternate LSP "A$_2$" (signaling identified with a "6" within a circle) to PE2 via P3 and P4 to establish LSP "A$_2$." Upon receipt of the signaling from LER PE1, LSRs P3 and P4 each setup their forwarding tables to locally establish LSP "A$_2$" for forwarding traffic on LSP "A$_2$." The ingress LER moves traffic to the new LSP once new LSP "A$_2$" is established (block 650). The ingress LER also discontinues sending traffic via LSP "A$_1$" once new LSP "A$_2$" is established. The ingress LER may continue to send traffic to the egress LER via new LSP "A$_2$" until deletion of LSP "A$_2$," or, in one implementation, until an instruction from network admin 110 is received instructing the ingress LER, and other LSRs on LSP "A$_1$," to return the traffic from LSP "A$_2$" to LSP "A$_1$" (i.e., when maintenance operations are completed). In other implementations, the mid-span re-optimization may proactively trigger network path re-optimization on a switch global basis periodically.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 6A and 6B, the order of the blocks may be varied in other implementations. Moreover, non-dependent blocks may be performed in parallel. Implementations have been described herein with respect to using Bypass MPLS FastReroute protection tunnels. The techniques described herein may also be equally applied to Reroute MPLS FastReroute protection tunnels.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   establishing, at an intermediate router in a network along a first path between an ingress router and an egress router using a label switching protocol, a first label switch path (LSP);
   establishing, at the intermediate router, a bypass tunnel to protect against link failure between the intermediate router and a next intermediate router on the first LSP;
   receiving, at the intermediate router from a network administration node, a link failure simulation instruction that instructs the intermediate router to simulate a failure of a link at the intermediate router;
   sending, from the intermediate router to the ingress router based on receipt of the link failure simulation instruction, a path error message that indicates that the first LSP is locally repaired and that traffic is supposedly being forwarded via the bypass tunnel, instead of the first LSP, but in actuality continues to be forwarded via the first LSP;
   continuing to forward traffic, at the intermediate router subsequent to sending the path error message, via the first LSP and not via the bypass tunnel;
   receiving second signaling, responsive to sending the path error message to the ingress router, at the intermediate router from the ingress router or from another intermediate router, wherein the second signaling is associated with establishing a new, second LSP on an alternate path between the ingress router and the egress router that is different than the first path associated with the first LSP and that is different than a second path associated with the bypass tunnel;
   initiating forwarding of the traffic, at the intermediate router upon receipt of the second signaling, via the new, second LSP on the alternate path between the ingress router and the egress router; and
   discontinuing forwarding the traffic, at the intermediate router, via the first LSP based on the second signaling.

2. The method of claim 1, wherein the bypass tunnel includes the second path from the intermediate router to the next intermediate router via one or more additional intermediate routers.

3. The method of claim 1, wherein the label switching protocol comprises Multiprotocol Label Switching (MPLS).

4. The method of claim 1, wherein the intermediate router is a label switch router (LSR) and wherein the ingress router and the egress router are label edge routers (LERs).

5. The method of claim 1, further comprising:
   receiving first signaling associated with the first LSP, wherein the first signaling includes a request for link protection,
   wherein establishing the first LSP is based on the first signaling and wherein establishing the bypass tunnel is based on the request for link protection.

6. The method of claim 1, wherein the path error message comprises a resource reservation protocol (RSVP) message.

7. The method of claim 1, wherein the link failure simulation instruction identifies a link, of the intermediate router, for which the failure is to be simulated, and includes a re-assigned link metric value for the identified link.

8. The method of claim 1, further comprising:
setting up, at the intermediate router based on the second signaling from the ingress router or from another intermediate router, a routing table to locally establish the new, second LSP,
wherein the forwarding of the traffic, via the new, second LSP on the alternate path between the ingress router and the egress router is based on the routing table.

9. An intermediate router, comprising:
multiple interfaces coupled to a network, wherein at least one of the multiple interfaces is coupled to a first path between an ingress router and an egress router in the network; and
a routing engine configured to:
receive first signaling associated with a first label switch path (LSP), wherein the first signaling includes a request for link protection,
set up, based on the first signaling and a label switching protocol, a routing table to establish the first LSP along the first path between the ingress router and the egress router,
set up the routing table to establish a bypass tunnel, based on receipt of the request for link protection, to protect against a link failure between the intermediate router and a next router on the first LSP,
receive, via one of the multiple interfaces from a network administration node, a link failure simulation instruction that instructs the intermediate router to simulate a failure of a link at the intermediate router,
send, to the ingress router based on receipt of the link failure simulation instruction, a path error message that indicates that the first LSP is locally repaired and that traffic is supposedly being forwarded via the bypass tunnel, but in actuality continues to be forwarded via the first LSP,
continue to forward traffic, subsequent to sending the path error message, via the first LSP instead of via the bypass tunnel,
receive second signaling responsive to sending the path error message to the ingress router, via one of the multiple interfaces from the ingress router or another intermediate router,
discontinue forwarding traffic via the first LSP based on the second signaling, and
delete the first LSP from the routing table based on the second signaling.

10. The intermediate router of claim 9, wherein the bypass tunnel includes a second path from the intermediate router to a next intermediate router via one or more additional intermediate routers.

11. The intermediate router of claim 9, wherein the label switching protocol comprises Multiprotocol Label Switching (MPLS).

12. The intermediate router of claim 9, wherein the intermediate router is a label switch router (LSR) and wherein the ingress router and the egress router are label edge routers (LERs).

13. The intermediate router of claim 9, wherein the path error message comprises a resource reservation protocol (RSVP) message.

14. The intermediate router of claim 9, wherein the link failure simulation instruction identifies a link, of the intermediate router, for which the failure is to be simulated, and includes a re-assigned link metric value for the identified link.

15. The intermediate router of claim 9, wherein the second signaling is associated with establishing a second LSP on an alternate path between the ingress router and the egress router that is different than the first path associated with the first LSP and that is different than a second path associated with the bypass tunnel, and
wherein the routing engine is further configured to:
initiate the forwarding of the traffic, upon receipt of the second signaling, via the second LSP on the alternate path between the ingress router and the egress router.

16. The intermediate router of claim 15, wherein the routing engine is further configured to:
set up, at the intermediate router based on the second signaling from the ingress router or from another intermediate router, the routing table to locally establish the second LSP,
wherein the forwarding of the traffic, via the second LSP on the alternate path between the ingress router and the egress router is based on the routing table.

17. A tangible non-transitory computer-readable medium containing instructions executable by at least one processor, the tangible non-transitory computer-readable medium comprising:
one or more instructions for receiving, at an intermediate router, first signaling associated with establishing a first label switch path (LSP) along a first path between an ingress router and an egress router, wherein the first signaling includes a request for link protection for the first LSP;
one or more instructions for establishing, at the intermediate router and based on receipt of the first signaling and a label switching protocol, the first LSP in a routing table;
one or more instructions for forwarding traffic, at the intermediate router, via the first LSP using the routing table;
one or more instructions for establishing, at the intermediate router and based on the request for link protection, a bypass tunnel to protect against link failure between the intermediate router and a next intermediate router on the first LSP;
one or more instructions for receiving, at the intermediate router from a network administration node, a link failure simulation instruction that instructs the intermediate router to simulate a failure of a link at the intermediate router;
one or more instructions for sending, from the intermediate router to the ingress router based on receipt of the link failure simulation instruction, a path error message that indicates that the first LSP is locally repaired and that traffic is supposedly being forwarded via the bypass tunnel, instead of the first LSP, but in actuality continues to be forwarded via the first LSP;
one or more instructions for continuing forwarding traffic, at the intermediate router subsequent to sending the path error message, via the first LSP, and not via the bypass tunnel;
one or more instructions for receiving second signaling, responsive to sending the path error message to the ingress router, at the intermediate router from the ingress router or from another intermediate router, wherein the second signaling is associated with establishing a second LSP on an alternate path between the ingress router and the egress router that is different than the first path associated with the first LSP and that is different than a second path associated with the bypass tunnel;

one or more instructions for initiating forwarding of the traffic, at the intermediate router upon receipt of the second signaling, via the second LSP on the alternate path between the ingress router and the egress router; and one or more instructions for discontinuing forwarding the traffic via the first LSP, at the intermediate router, based on the second signaling.

18. The tangible non-transitory computer-readable medium of claim 17, wherein the bypass tunnel includes the second path from the intermediate router to the next intermediate router via one or more additional intermediate routers.

19. The tangible non-transitory computer-readable medium of claim 17, wherein the path error message comprises a resource reservation protocol (RSVP) message.

20. The tangible non-transitory computer-readable medium of claim 17, wherein the label switching protocol comprises multiprotocol label switching (MPLS).

21. The intermediate router of claim 17, wherein the intermediate router is a label switch router (LSR) and wherein the ingress router and the egress router are label edge routers (LERs).

22. The tangible non-transitory computer-readable medium of claim 17, wherein the link failure simulation instruction identifies a link, of the intermediate router, for which the failure is to be simulated, and includes a re-assigned link metric value for the identified link.

* * * * *